United States Patent [19]

Pryor

[11] Patent Number: 4,875,776
[45] Date of Patent: Oct. 24, 1989

[54] ELECTRO-OPTICAL INSPECTION

[75] Inventor: Timothy R. Pryor, Tecumseh, Canada

[73] Assignee: Diffracto Ltd., Windsor, Canada

[21] Appl. No.: 48,501

[22] Filed: May 5, 1987

Related U.S. Application Data

[60] Continuation of Ser. No. 815,270, Dec. 24, 1985, abandoned, which is a continuation of Ser. No. 531,216, Aug. 26, 1983, abandoned, which is a division of Ser. No. 269,614, Jun. 2, 1981, Pat. No. 4,576,482, which is a continuation of Ser. No. 73,226, Sep. 3, 1979, abandoned.

[51] Int. Cl.$^4$ .......................... G01B 11/00; B07C 5/10
[52] U.S. Cl. ...................................... 356/372; 209/586; 356/375
[58] Field of Search ............... 209/538, 540, 545, 555, 209/556, 558, 586–588; 250/560–562, 571, 572; 356/23, 72, 73, 372, 373, 375, 376, 381, 383–387, 394, 237, 379

[56] References Cited

U.S. PATENT DOCUMENTS

| | | | |
|---|---|---|---|
| 1,640,567 | 8/1927 | Firestone | 356/426 X |
| 2,415,176 | 2/1947 | Hurley, Jr. | 209/586 X |
| 2,531,317 | 11/1950 | Baney et al. | 209/538 |
| 2,970,691 | 2/1961 | Ungerer | 209/3.2 |
| 3,462,015 | 8/1969 | Tysver et al. | 209/538 |
| 3,484,615 | 12/1969 | Noro et al. | 356/379 |
| 3,604,940 | 9/1971 | Matthews | 356/386 |
| 3,662,341 | 5/1972 | Baumgartner et al. | 382/9 X |
| 3,666,885 | 5/1972 | Hemsley et al. | 358/107 |
| 3,718,823 | 2/1973 | Niikura et al. | 250/561 X |
| 3,743,428 | 7/1973 | Brown | 356/387 |
| 3,749,500 | 7/1973 | Carlson et al. | 356/387 X |
| 3,830,401 | 8/1974 | Benwood et al. | 222/57 |
| 3,852,579 | 12/1974 | Sohn et al. | 356/387 X |
| 3,874,798 | 4/1975 | Antonsson et al. | 356/386 |
| 3,901,606 | 8/1975 | Watanabe et al. | 364/560 X |
| 3,918,049 | 11/1975 | Snyder et al. | 382/51 |
| 3,918,586 | 11/1975 | Tyler et al. | 209/586 |
| 3,935,562 | 1/1976 | Stephens | 377/10 X |
| 3,947,129 | 3/1976 | Wiklund | 356/385 |
| 3,994,589 | 11/1976 | Nodwell et al. | 356/375 X |
| 4,088,411 | 5/1978 | Ahlquist et al. | 356/383 |
| 4,097,159 | 6/1978 | Strandberg | 356/376 |
| 4,105,925 | 8/1978 | Rossol et al. | 356/376 X |
| 4,117,539 | 9/1978 | Bell et al. | 356/426 X |
| 4,122,525 | 10/1978 | Eaton | 364/560 |
| 4,152,767 | 5/1979 | Laliotis | 364/560 |
| 4,192,613 | 3/1980 | Hammar | 356/376 X |
| 4,240,107 | 12/1980 | Yoshida | 358/96 X |

FOREIGN PATENT DOCUMENTS 0476850 12/1952 Italy ..................................... 209/586
0414112  6/1974 U.S.S.R. ............................. 209/558

Primary Examiner—Johnny D. Cherry
Assistant Examiner—Edward M. Wacyra

[57] ABSTRACT

A method and apparatus for inspecting workpieces for rapid and accurate determination of dimensions and the like. The equipment is electro-optical in nature and there is no contact between the inspecting elements and the workpiece under inspection. An electro-optical sensor is utilized which includes a light source for illuminating at least one edge of a workpiece, a lens for forming an image of the illuminated edge, and an array of photosensitive elements, such as photodiodes, capable of producing an electrical signal in response to light incident thereon. The light, including the edge image, is impinged upon the array and the electrical signals produced correspond to the portion of the edge, its shape, etc. The signals can be rapidly analyzed to provide a determination of a dimension such as length, squareness, curvature, and the like.

5 Claims, 8 Drawing Sheets

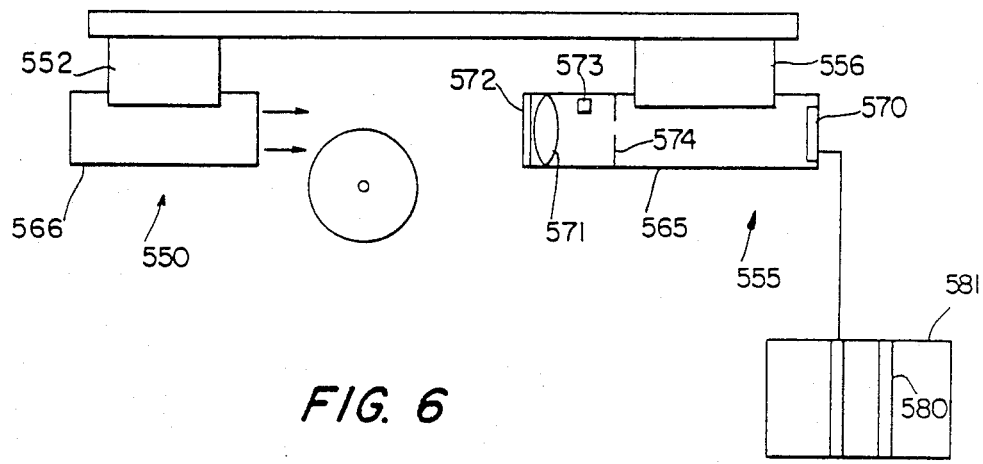
FIG. 6
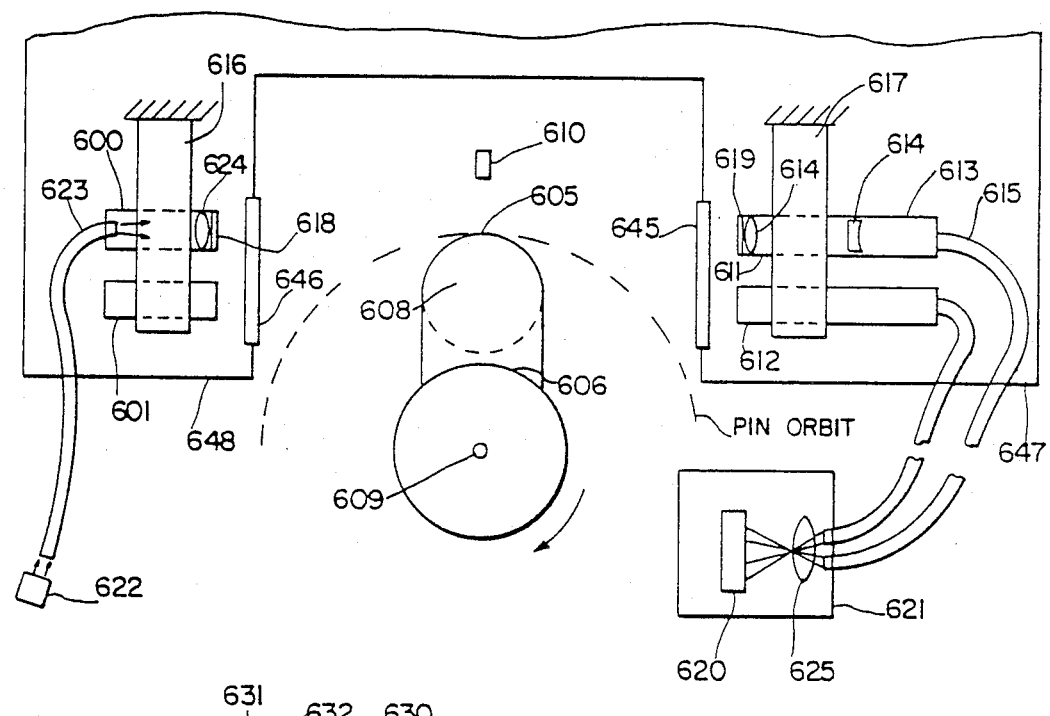
FIG. 7a
FIG. 7b (END ELEVATION OF FIG. 10b)

ELECTRO-OPTICAL INSPECTION

This application is a continuation of application Ser. No. 815,270 filed Dec. 24, 1985, now abandoned, which is a continuation of application Ser. No. 531,216, filed Aug. 26, 1983, now abandoned, which is a division of Ser. No. 269,614, filed June 2, 1981, now U.S. Pat. No. 4,576,482, which is a continuation of Ser. No. 073,226, filed Sept. 7, 1979, now abandoned.

BACKGROUND OF THE INVENTION

This invention relates a method and apparatus for inspecting workpieces such as camshafts, crankshafts, engine valves, automotive body panels, and the like. In one aspect, this invention relates to such inspection for the purposes of determining a dimension of the workpiece such as length, thickness, squareness, curvature, and the like. In particular, the invention relates to such apparatus and method capable of very rapid and accurate measurements and more particularly to such measurements made "on the fly", that is, when the object is moving. The invention further relates to such method and apparatus which utilizes an electro-optical type of gage and in which there is no physical contact between the workpiece and the gage.

Many devices are known to be suitable to inspect workpieces for the purpose of determining dimensions and the like. While some are rapid, some are reliable, some are accurate and some are capable of measuring dimensions of complex workpieces such as a crankshaft, it is an object of the present invention to provide methods and apparatus for accomplishing all of these objects simultaneously.

BRIEF SUMMARY OF THE INVENTION

The foregoing and other objects which will be apparent to those of ordinary skill in the art are achieved in accordance with the present invention which in one embodiment comprises an electro-optical sensor apparatus for sensing a dimension of a workpiece, the sensor apparatus comprising light source means for illuminating at least one edge of a workpiece, lens means for forming an image of the illuminated edge of said workpiece, and a photodiode array comprising a plurality of photodiodes capable of producing an electrical signal in response to light incident thereon, said array being positioned to receive the image of an illuminated edge of a workpiece.

In a further embodiment, the invention provides an apparatus for inspecting an elongate workpiece, the apparatus comprising means for mounting an elongate workpiece for rotation about its longitudinal axis, means for rotating a mounted workpiece, an electro-optical sensor unit for sensing the position of a portion of a mounted workpiece, said sensor unit comprising a light source means for illuminating an edge of the portion of a mounted workpiece, a lens means for forming an image of the illuminated edge of a mounted workpiece, and a photosensitive array comprising a plurality of light sensitive elements capable of producing a signal in response to light incident thereon, the array being positioned to receive the image of an illuminated edge of a mounted workpiece and means for analyzing the signals from said light sensitive elements to determine a dimension of the portion of the workpiece.

The apparatus just described has particular application to the inspection of camshafts, crankshafts, engine valves and other machined elongate workpieces where rapid and accurate measurements of dimension are important, particularly when close tolerances are required, such as for increased fuel economy in internal combustion engines. In this event, the apparatus is preferably provided with means for automatically transferring the workpiece in question from a production line conveyor system on which the workpiece is normally moved, into an inspection location in the apparatus and, after inspection, back to the conveyor system. It will be readily appreciated that in a production line inspection system such as this, speed is essential.

In a further embodiment, the invention provides apparatus for inspecting a generally planar workpiece such as an automobile body panel, the apparatus comprising means for conveying said workpiece to an inspection location, means for positioning a workpiece in a predetermined reference position in said inspection location, electro-optical sensor means for sensing the positions of a plurality of edge portions of a workpiece positioned in said inspection location, said sensor means comprising a light source means for illuminating a plurality of edge portions of a positioned workpiece, lens means for forming an image of said illuminated edge portions, and a plurality of photosensitive arrays, each array comprising a plurality of light sensitive elements capable of producing an electrical signal in response to light incident thereon, each array being positioned to receive an image of a respective illuminated edge portion of a positioned workpiece, and means for analyzing the signals from the light sensitive elements to determine a dimension of the workpiece.

A first embodiment of a method of the invention comprises a method for sensing a dimension of a workpiece comprising illuminating at least one edge of a workpiece, forming an image, by a lens means, of the illuminated edge of the workpiece, and impinging the image of an illuminated edge of the workpiece upon a photodiode array comprising a plurality of photodiodes capable of producing an electrical signal in response to light incident thereon.

A second embodiment of a method of the invention comprises inspecting an elongate workpiece, the method comprising mounting an elongate workpiece for rotation about its longitudinal axis, rotating the mounted workpiece, illuminating an edge of a portion of a mounted workpiece, forming an optical image of the illuminated edge of the workpiece, detecting the image of the illuminated edge of the mounted workpiece on a photosensitive array of light sensitive elements capable of producing a signal in response to light incident thereon, and analyzing the signals from said light sensitive elements to determine a dimension of the portion of the workpiece.

The method just described has particular application to the inspection of crankshafts, camshafts, engine valves and other elongate workpieces where, as mentioned above, rapid and accurate measurements of dimension are important.

In a further embodiment, the invention provides a method for inspecting a generally planar workpiece comprising conveying said workpiece to an inspection location, positioning said workpiece in a predetermined reference position in said inspection location, illuminating a plurality of edge portions of a position workpiece, forming an image, by lens means, of said illuminated edge portions, impinging each of the images onto a photosensitive array, each array comprising a plurality of light sensitive elements capable of producing an electrical signal in response to light incident thereon, and analyzing the signals from the light sensitive elements to determine a dimension of the workpiece.

There follows a detailed description of preferred embodiments of the invention, together with accompanying drawings. However, it is to be understood that the detailed description and accompanying drawings are provided solely for the purpose of illustrating preferred embodiments and that the invention is capable of numerous modifications and variations apparent to those skilled in the art without departing from the spirit and scope of the invention.

BRIEF DESCRIPTION OF THE DRAWINGS

FIG. 6 is a diagrammatic end elevation view of a portion of a further embodiment of the invention;

FIG. 7A is a diagrammatic end elevation view of a further embodiment of the invention as applied to the inspection of crankshafts;

FIG. 7B is a diagrammatic end elevation view of a detail of FIG. 7A.

DETAILED DESCRIPTION OF THE PREFERRED EMBODIMENT

Figure 1:
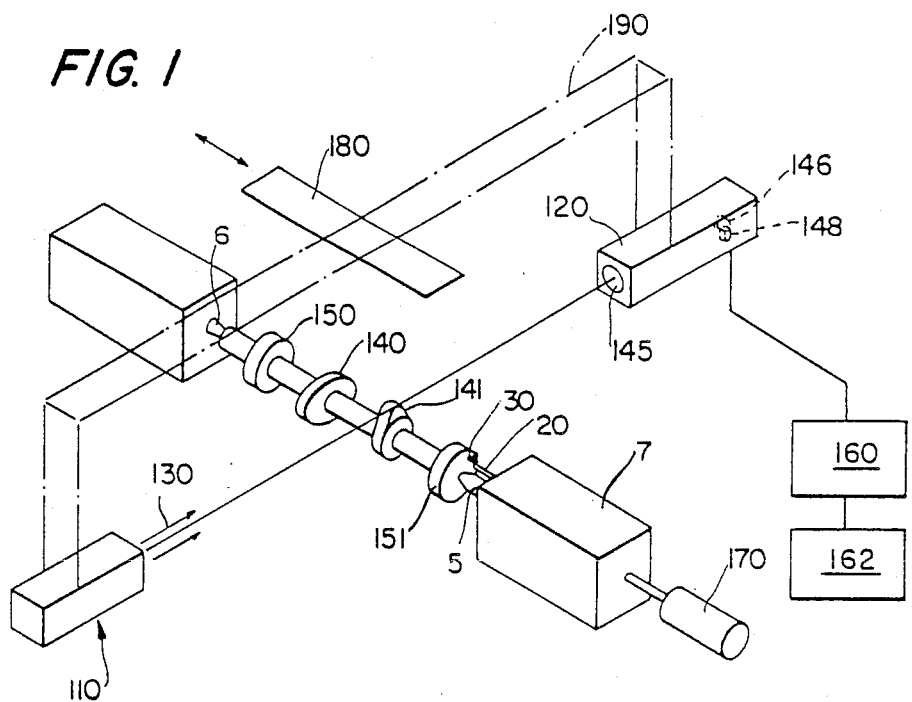
FIG. 1 is a diagrammatic view of a first embodiment of the invention as applied to camshaft inspection.

The embodiment of the invention depicted in FIG. 1 provides a new type of inspection gage for inspecting automotive and other camshafts. The need for such a gage is widespread due to the ever increasing requirements for improved engine omissions and fuel economy. Far more stringent requirements in the quality of camshafts result and 100% inspection of all pertinent variables is the only answer.

In order to achieve true 100% inspection of all camshafts on an economic basis, the invention here described appears to be the only realistic method of achieving this goal. In addition, the invention is also of use on crankshafts and other parts.

The invention here disclosed can inspect a typical automotive camshaft in approximately 20 seconds for:
  (1) Base circle runout
  (2) Contour 360°
  (3) Surface defects on lobes and journals
  (4) Journal diameter, and a host of other variables The gage disclosed is not limited to cams alone and can be used on other similar parts such as crankshafts, engine valves and the like, generally while the parts are rotating in place.

In addition, the invention discloses unique gages for the inspection of quasi flat objects such as automotive body panels, pump vanes, chain link side bars and the moving past the gage on conveyors.

Further disclosed are unique sensor arrangements containing miniature housings some with fiber optic transmission means.

An embodiment of one form of the invention is shown in FIG. 1. A camshaft such as those used on a 4 cylinder automobile engine (diagramatically shown here for clarity, however, as having only two journals and two lobes) is held on centers 5 and 6 with the center 5 driven by motor 7 utilizing a fixture detail 20 picking up on the drive pin 30 of the camshaft.

At the particular point in time, an electro-optical sensor head 100 according to the invention is positioned so as to inspect cam lobe 141. It is noted, that in this case the camshaft is shown having only two lobes 140 and 141 and two journals 150 and 151 even though in practice there would be a much larger number of lobes and journals.

The sensor head is composed of light source unit 110 and sensor unit 120. As shown the illuminating radiation 130 from the source unit is projected across the cam lobe in profile. At a minimum, the sensor unit comprises lens 145 which forms the image 146 of the lobe tangential edge on photo diode array 148. The edge image so obtained on the photo diode array moves up and down with rotation in an essentially equivalent manner to that in which the lobe moves a flat faced follower such as on a hydraulic lifter.

Readout unit 160 analyzes the photo diode array output to find the position of the lobe image and thence the lift contour as a function of angle, with angular data provided by shaft encoder 170 located on the cam motor drive. Optional computer 162 compares the data so obtained, corrects it if necessary, to preset limits to arrive at an accept/reject decision.

In operation, the cam is rotated and at every degree, for example, as indicated by the shaft encoder, an array scan is made to determine the lift of the lobe at that particular angular position. When 360° of rotation have been completed, the computer can then compare the data obtained to the stored values for that cam lobe and accept or reject the cam based on that data.

In practice, there are many lobes on the cam that need such inspection and the traversing means 180, shown schematically, is utilized to position the ensemble of the sensor head and source unit (which may be rigidly connected by bar 190) at each of the cam lobes in succession.

Typically a gage of this type would also include additional sensor units where required to sense the journal diameters and possibly optional sensing units to look for defects on the journals and lobes for example, using equipment as covered in co-pending application Ser. No. 15,792, filed Feb. 2, 1979, now U.S. Pat. No. 4,350,661, the disclosure of which is herein incorporated by reference.

Machines such as this can be hand-loaded with the cams put into place and the centers brought in or can alternatively be automatically loaded along the lines of equipment shown in further embodiments. The gage is particularly useful in the automatic loading form due to the fact that it can operate fast enough and reliably enough to do all the cams of a plant on a production basis. This is a unique capability not previously available and vital if fuel economy and emission goals are to be met.

Speed of measurement coupled with accuracy and reliability is the very essence of this embodiment of the invention. The very high reading rate of the system so described together with the non-contact, no wear operation allows the reading of the lobe contours at much higher rotational rates than would ever be possible with the contact type measuring used heretofore. This allows one to measure each lobe within a fraction of a second and thus complete a scan down an axis of a camshaft which may contain as many as 16 lobes and 5 journals (for a V8) and still meet a production rate of approximately 150–200 parts/hr. This is essential if it is to be used in a modern high volume manufacturing plant. Such speed of measurement is at least twenty times faster than any equivalent camshaft gage used heretofore.

Figure 2:
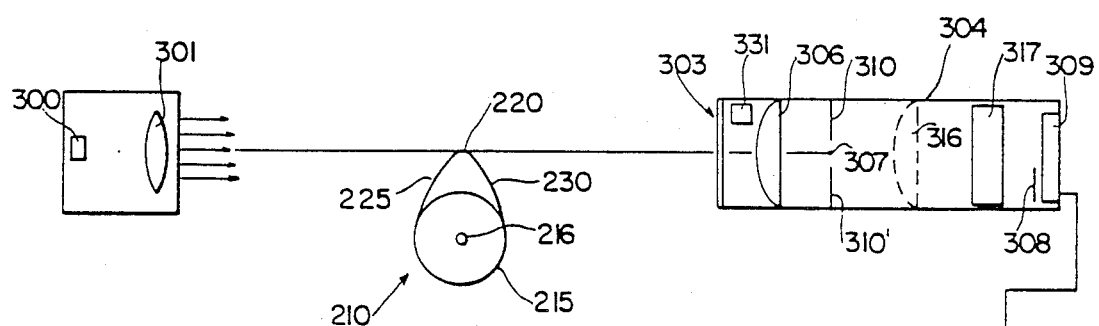
FIG. 2 is a diagrammatic end elevation view of a portion of FIG. 1.

A typical lobe section 210, shown in FIG. 2 is comprised by base circle region 215 extending slightly more than 180° and concentric to the cam axis 216, max lift point 220, and open and closing ramp zones 225 and 230.

The base circle region corresponds to the region of the circle where the valve is closed and is critical if leakage is to be avoided, causing emissions. The ramp portions become critical primarily for fuel economy reasons.

Details of the sensor unit are shown in the side view of FIG. 2. As shown in the figure, a light source, in this case, a diode laser, 300, produces divergent output radiation which is collimated by the lens 301 and projected across the camshaft lobe, 210. The radiation passing by the lobe (plus that reflected from the polished surface of the cam lobe near the tangential edge) passes through window 303 in housing 304 and is converged by positive lens 306 to form the image 308 on photo diode array 309. This photo diode array may contain as many as 2,048 elements (the present maximum although it is envisioned larger ones will be available in the future) on 15 micron centers.

The movement of said image edge position 308 is monitored by readout 311 to give an exact digital position of where the edge is. With the lens magnification of 3:1 shown, the lift of the cam lobe (for example, 0.3 inches maximum) then inscribes a 0.9 inch maximum movement on the diode array which itself is 1.1 inches long approximately. Thus the lobe position is kept on the diode array at all times.

For absolute maximum speed of response, the best currently available photo diode array is the Reticon 1872F having 0.030" wide elements and capable of 20 MHz element to element scan rates (given its 1872 elements 10,000 scans per second is possible although, in practice somewhat less than this is generally encountered). This means that taking data every degree (which is generally more than ample) one can achieve a camshaft rotation speed of at least 1500 rpm! In practice there is seldom a need to go this fast but the capability is there.

Such high array speeds can allow one to achieve essentially instantaneous results even at perfectly adequate rpm's of let us say 200 to 300 rpm, using continuous light sources such as gas lasers and white light sources. However, it is of interest to consider utilization of a pulsed light source such as the pulsed diode laser shown in the figure or, for that matter, a pulsed LED if sufficient power is available. The pulsed source can be triggered to pulse every degree as an output of the shaft encoder with a pulse rate of 200 nsec. (diode laser) to 10 sec. (LED or Xenon strobe).

Such pulse operation "freezes" the image of the edge of the camshaft on the diode array and allows the scan to read it out before the next pulse. Thus the array can run at scan rates in the 1 KHz range, with no blurring and uncertainty due to the movement of the camshaft, particularly in the rapidly changing lift and falloff areas. Alternatively one can strobe the arays using special circuitry to commence their scan as a function of the encoder position but this requires higher frequency response arrays with ample cw power.

As shown further in FIG. 2, there are other optical elements which are of use in such measurements. For example, the window 303 is almost always used simply to protect the optics and to make it easy for operators to clean since a certain dirt build up will affect the readings.

Second, a stop 310, generally placed near the focus 307 of lens 306 is often desirable to at least block the direct reflected waves from the leading edge of the camshaft. Also for depth of field enhancement, it may be desirable also to block the diffracted waves as well using a lower stop 310. It should be noted that depth of field to a degree is desired because of the fact that the cam lobe runs out relative to the centerline of the camshaft established in this case by centers 320 and 321.

Also of value may be a second lens 316 to provide a substantial optical magnification in a smaller package or conversely to provide the classic telecentric lens system used for maximum depth of field.

Also an optional cylinder lens 317 may also be used to further converge light along the axis of the cam onto the diode arary. The reason for this is that the diode array size even with the 0.030 inch wide elements of the 1872F (which has some of the largest width elements obtainable) still with 3:1 magnification is only covering a zone 0.010" on the surface of the cam in the axial direction ('w' in the diagram). Since the light field is typically much broader than this as is the cam lobe itself, it is obvious that it may be desirable to look at a larger length of the cam lobe to improve the power density onto the diode array as well as to make this system relatively less sensitive to minor nicks, dirt, etc. on the lobe if any. This is, of course, particularly true if diode arrays having smaller width elements are used. For example the Reticon 1728G with elements approximately 0.001 inch wide.

Other optical elements that may be of use are auxilliary detector 331 used to monitor the light power (not blocked by the cam lobe (ie. in the zone above the max lift position). These elements, when provided at the sensor side as shown actually monitor the power actually transmitted through. The power monitor is then used as a compensation signal for window dirtyness, light power degredation and light power errracticness which can occur with pulsed systems which then is used in the circuitry shown below. All in all, a very valuable addition.

While it is envisioned that a primary use of this invention will be to inspect the total lift contour, the lobe 360° including all regions of the cam, there are several checks also possible with the invention which can be done at less cost (since far fewer data points are required). These are base circle runout (typically allowed to be 0.001", max.), max lift and phasing of max lift to dowel pin or number of lobe. Somewhat more difficult is rate of lift error in the ramp zones, eg. 0.0001" deviation from true over a 10° zone.

The invention can also check chatter on any of the portions by comparing the high frequency rate of change of position. To do this digitally, however, requires a high data rate since readings are desirably every half degree or better. It is also possible to do it analog fashion by band pass filtering of the output of a single analog detector positioned to see the same light field as array 309 and looking for high frequency components indicative of chatter (typically periodic).

It is noted that to check base circle, much less range is required, typically 0.010" max, making a simpler sensor unit. Max lift and phasing can typically also be done with similar low range sensors, mounted, however, at a different location (ie. centerline 0.300" above base circle sensor centerline).

Let us consider now the magnification required of the system. Since the typical automotive camshaft lobe lifts are in the range 0.25 to 0.3 inches, it is clear that the maximum length of diode array available today of about 1.1 inches in length then means that an optical magnification at least using a single diode array system, of no more than approximately 3 or 4:1 can be utilized. Such magnification is easily obtained with common high quality enlarging lenses and if good lenses are utilized the total magnification is virtually linear over the entire range of lift. Any non linearities if they are present, can be compensated in the computer by simply storing the values obtained from a master cam of known dimension and correcting the values obtained in practice. Such a correction which utilizes a built-up table of values actually takes no more time since it is simply the corrected values that are used for the comparison points rather than the values taken off the blueprint. Naturally, for this technique to work, any sensor non-linearity must be repeatable but this is generally true given the same lens system and the same light field both of which are virtually invariant. Some precaution has to be made with the light fields from pulsed diode lasers but generally this can be sufficiently invarient to make such a plan effective.

Figure 4:
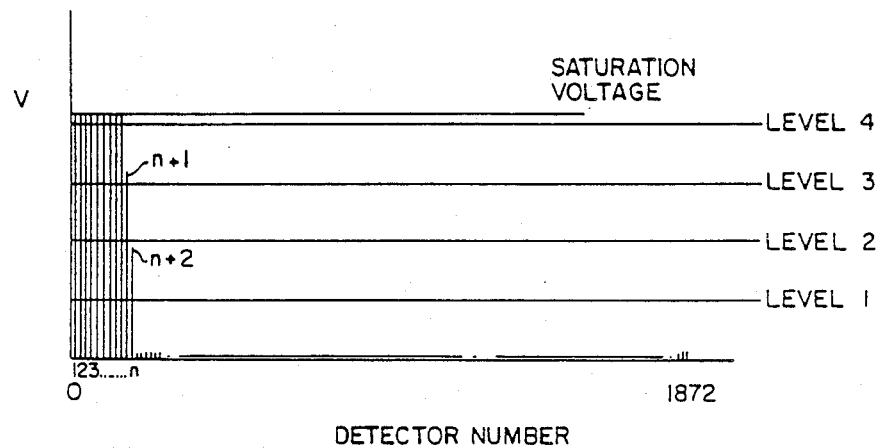
FIG. 4 is a graphical representation of an electrical signal output from a plurality of photodetectors of the device shown in FIG. 1.

Returning to the question of magnification unless larger arrays become available or multiple arrays are used, it is clear that no more than 4:1 can be utilized optically and it is of course noted that at 4:1 the image is quite clear. A typical diode array output is shown in FIG. 4. As can be seen, this shows a sequence of detector elements of such an 1872F array the elements being numbered 1 through 'n' respectively which are all in the lighted zone of the light field at which time the edge of the cam is appeared and the zone decreases to dark very rapidly within the space of approximately 2 elements. The exact slope of the curve depends, of course, on the system depth of focus and the location of the part edge. If telecentric systems are used, more elements are contained within the edge image, although less variation in the number of elements is obtained throughout the rotation.

At a 4:1 magnification, it is clear that with a 16 micron center to center spacing, each element of the diode array is reading in lift increments 4 microns. Since resolution of generally 2 to 4 times this amount is desirable in inspecting camshafts, a question comes up how to achieve this. Resolution of 1 micron is achieved in this instance by utilizing a 4 times threshold circuit which functionally operates as follows.

Since 4X electronic multiplication is desired, levels are utilized, levels 1, 2, 3 and 4 with four level 4 being the level closest to the 15 volt typical saturation voltage of the silicon detectors. In this case, it has been desired to drive all of the detectors into saturation although not too far. The levels are then set up up to the 15 volt range for example, at 3, 6, 9 and 12 volts respectively.

The answer then is obtained using the equation below wherein the number of lit detectors is equal to the sum of the detectors of the array crossing each level divided by 4, $$\text{Count (i.e. answer)} = \frac{\text{Sum of detectors crossing each level}}{\text{Number of threshold levels}}$$

In the example shown, a continuous row of 'N' detectors have outputs above threshold voltage level 4, N+1 are above level 3, N+1 above level 2 and N+2 above level 1.

As can be seen in the example shown, the number is equal to the number of detectors crossing the top level, level 4, plus ¾. In other words the system has resolved to essentially within ¼ of a detector thereby essentially enhancing the packing density of the array by a factor of 4. For such a circuit to function well it is necessary that the power be stabilized to at least the level of multiplication required (eg. 1 part in 4). This can be accomplished using the auxilliary detector 331 which is used to set up the threshold levels as a function of input light power. Generally speaking, such a level detection circuit is practicable up to approximately 10 times, beyond which differences in the individual detector sensitivities etc. can start making the answer less and less trustworthy. It should be noted, of course, that the resolution obtained can be extremely high; for example 0.4 microns or 16 millionths of an inch at a factor of 10 times with 4× optical magnification.

Basically this sensor is all digital from the diode array although the last detection of the levels is obviously done on a quasi analog basis and any drift in the levels can manifest itself in a changed answer. This again is another reason for not trying to push the level of detection beyond a factor of roughly 10.

Clearly it is the ability of the sensor head to take very high resolution measurements at a high data rate that allows this machine to have the specifications that it does. However, the rest of the parts of the machine are also valuable in applying this invention in practice. For example, in order for it to check cams on a production basis at rates of one every 20 seconds or less, it is necessary to have the following components:

(1) A means to move the cams into position. This is actually optional as the cams could be hand-loaded into the machine but generally a full automatic machine is desirable. The typical movement device is a walking beam transfer.

(2) A means to pick the cams up off the walking beam.

(3) A means to revolve the camshaft at the rated measurement speed which is typically 60 to 300 rpm depending on part rate, number of lobes and journals to be inspected etc.

(4) Means to scan the sensor head down the length of the cam together with control means to cause the readings to be taken at certain axial locations down the length of the cam.

(5) Encoder and pickup means to encode the rotational position of the cam relative to a feature such as a dowel pin or hole on the end of the cam that is used for timing.

(6) The sensor means used to take the data (7) Readout and analysis means such as microcomputer(s) to analyze the data and make the accept/reject decision.

Typically, additional equipment utilized are marking means to mark the defects of the cams and, in some cases, what is wrong with them and reject means to direct the bad cams from the production stream.

Similar points required to make the described fully automatic system work are now mentioned. For example, the computer system not only must compare the data to stored values, but if the part is fixtured on centers the computer must correct for the natural bow in the cam which is not desired in the lift answer. This can involve considerable programing and generally requires two microcomputers to be used, one to control and read data from the sensor head into the memory plus a second to simultaneously operate on the data obtained from the previous camshaft. Such correction, of course, is not required for bow if the cam is located with the journals clamped which trades mechanical complexity for the computer.

Figure 3:
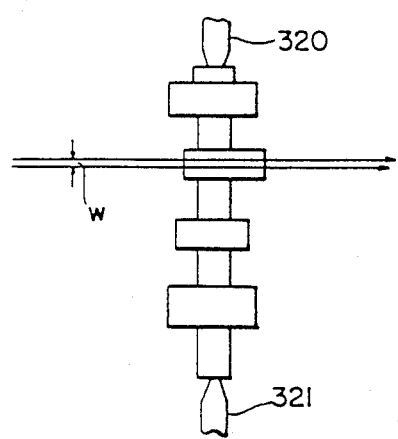
FIG. 3 is a diagrammatic plan view of a portion of FIG. 1.
Figure 5:
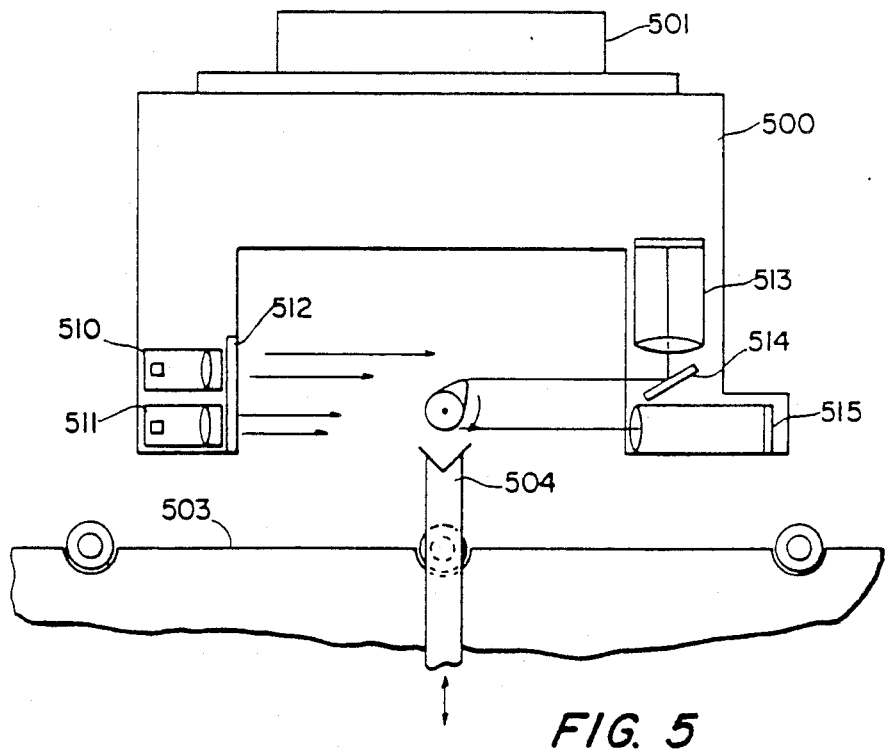
FIG. 5 is a diagrammatic end elevation view of a device of the type shown in FIG. 1 and showing a conveyor and housing not shown in FIG. 1.

A FIG. 5 illustrates too how a typical sensor head can be placed over the automation. In this case an inverted "U" shape housing 500 is mounted on motorized slide 501 which moves it down the axis of the cam as described above. In the housing are two light sources 510 and 511, of the type described in FIG. 2 and 3 above illuminating the cam through window 512 and a sensor head 513 viewing through mirror 514 the cam lobes also typically as described above. In the case depicted, a further sensor head is used to sense the bottom edge of the journal, 515. The top of the journal, diametrally opposed, is sensed with the main lobe sensor, 513. It is noted that this sensing of the journal top and the cam lobes is possible because journals are typically at almost the same radial position from the cam axis as the max lift point of the cam lobes.

Also shown on this particular sketch is a transfer means 503 typically of the "walking beam" or "lift and carry" type to move the cams into the cam gage pick-up position and lift means 504 to lift the cams out of the transfer up into the actual gaging station, where in this case the cam is picked up on centers and rotated.

When the gaging is over, the centers retract and lift means 504 lowers the part back down onto the walking beam. The cam then is transfered out to an idle station and thence to a reject or accept track further on down the line.

Such an arrangement has proven to be an excellent way to transfer the cams through, gage them and move them out without the difficult mechanical contacts and crash possibilities of normal camshaft gaging.

Under certain conditions, it may be necessary to simultaneously determine the radial location of the two end journals while the cam is being rotated between centers. This can be accomplished by two sensors of the type 513/515. Checking the radial runout of these journals allows one to correct for possible eccentricity in the cam due to imperfect spindles, centers and the like. The reason for doing this is that one is essentially assuming the cam rotates in a repeatably time varying manner, and if this is not the case, it is necessary to monitor the two end journals as a function of 360° rotation and compare the other journals to them in order to develop the profile of the camshaft and determine the true centerline of the cam at all times such as the data can be compared.

There are some very positive features about this system which are not present in other optically based systems that may have been used in the past on camshafts. For example, the accuracy is sufficient to make the measurements in a manner that can be useful since the sensor unit is an all digital device and capable of extreme long term stability with no drift etc. Another feature is, of course, that the data rate taken by this device can be high enough on the order of 1,000 or more measurements per second to allow an effectively high camshaft scan rate to be obtained. For example, if the scan rate of the sensor was only 100 readings per second, and one which to read 360° around the camshaft, this would then require 3 seconds or greater simply to do one lobe.

It is of interest now to consider the dynamics of this system. For example, if one is inspecting a four cylinder camshaft, there are typically five journals and eight lobes each of which have to be inspected or a minimum of 13 axial locations of interest. Typically, however, one may also wish to get the taper off the journals and lobes which add another 13 points, and in many camshafts one may also look at the runout of the fuel pump eccentric if there is one, the pump gear runouts and other features using additional sensor heads which will be further described. These may include the thrust runout of the camshaft thrust face and the surface defects on the lobes and journals that cannot be seen as a function of dimension.

Where the number of features are limited as in the 13 of a basic 4 cylinder cam measure, the gage can be set up easily to dwell at each of the points while still maintaining the normal production run time of 15 to 20 second cycle or greater in Europe.

For a typical camshaft 15 inches long and rotating at 300 rpm, this means that one would use up 3 seconds of the scan in looking at let us say, up to 15 features, plus approximately 5 seconds in making the actual travel between lobes in the incremental steps or a total of an 8 second scan time. This, coupled with a typical transfer time of 6 seconds, yields a gage cycle of 14 seconds, which is perfectly acceptable.

However, as the number of features grow, it is obvious that one cannot afford the dwell time in this system and one then must consider the sensing of the camshafts while the sensor is moving. This involves figuring the taper of the camshaft lobe data into the actual equations for the lobe contours a function of rotation. Another alternative is the use of multiple sensor heads operating in parallel, discussed below.

Where speeds have to be maintained even higher, for example, if all the tapers are desired, it may be necessary to use a dual headed sensor. In this case, two heads spaced at half the cam length are utilized and each one is asked only to take data over half the length of the cam. If these are moved under independent motion, it is clear that the effective scan time can be cut in half and with slightly worse results if one moves them together which means certain ones may have to be idle while the other measure if the lobes and journals are not equally spaced.

If this is required it may be necessary to use individual sensors for each lobe and journal. Naturally two are required for the journals whereas only one of much larger range for the lobes.

An example illustrating this case is shown in FIG. 6 and of particular interest in this illustration is a simplified sensor head which can be implemented for this particular application. It is noted that this sensor head must be of sufficiently small size to be packed in close enough to do the lobes unless complicated mirror systems etc. are utilized.

Essentially two sizes are envisioned, the first using a small diode array of 256 elements or less necessary only to see the journals and base circle regions of the cams (if the total lobe contour is not of interest). The second version has a larger diode array typically between 1700 and 2100 elements and used for the total lift. These versions are also well suited to inspection of other parts as well, such as crankshaft journals, pistons and the like.

Both units are shown in essentially cylindrically symetric housings. The light source unit 550 is located in Vee block 552 and the sensor units 555 located in Vee block 556. Both locating blocks are optionally connected using optional bar 560. The sensor and light source units utilize cylindrical housings 565 and 566 respectively. Internally, both units are similar to those described above. The cylindrical housing is easy to mount in Vee blocks, which makes for easy lineup and replacement. The housing utilized is generally only large enough to incorporate the particular diode array utilized, 570, with lens 571 to match. For example, the Reticon 256C array can be accommodated within a housing size of 0.75 inches which is small enough to be packed in on each lobe of a typical camshaft for example. The lens 571 is put in from the front with optional window 572 and power monitor detector 573 and lens stop 574.

For larger arrays, a housing size of two inches is required. A rectangular box can be utilized or a mirror system is required to accommodate their placement since the center to center spacing of the lobes is typically 0.8 inches.

Note that the diode array is mounted directly to the steel portion of the housing and not to flimsy circuit board that has been commonly used in practice previously. This is necessitated because of the precision with which sensor systems such as this are utilized.

With the array mounted thusly and the limited sensor box size available, it is generally desirable to mount the circuit cards 580 which drive the array in an external card rack 581 located as nearby as possible (because of the problems in high speed signals over long lines). Where possible these can be clustered together into one rack for serving multiple sensors. If necessary one rack per sensor can be used.

Obviously, other box arrangements could be utilized which would allow the large diode arrays to be used without the mirror. In short they would have essentially non cylindrical box housings where the array could extend in the vertical axis.

Naturally the use of such multiple sensor heads provides the fastest possible part rate. Generally a cost disadvantage is incurred in the camshaft gage where large numbers of high range sensors are required. It can, however, be the best solution if the high speeds and utmost reliability are required since no mechanical motion is utilized.

It should be noted, however, that the mechanical motion of moving the sensor head down the camshaft axis has a valuable feature in providing a degree of programability between different camshafts. In short, to change camshafts it is only necessary to program in the different data points with which to make a comparison as well as the different axial locations where the sensor head should take its readings and too a master block can be read each cycle to verify a gage operator.

This allows a very interesting feature of the scanning type approach is that in one can actually intermix camshafts on the same line. The invention contains the further provision of providing a sensor such as in FIG. 5 to observe from a mark placed on the cam which cam is being gaged and adjust either the data and perhaps the axial locations and even the drive positions of the motor driven slides to accommodate that camshaft. It is not, for example, out of line to even include possibility of intermixing V6 and 4 cylinder camshafts on the same machine!

The forgoing discussion has been primarily directed at the inspection of camshafts which is certainly the most necessary in terms of the camshaft's tremendous influence on fuel economy and emissions, and too, the invention here disclosed offers the only known really good way of 100% inspecting all of a plant's production in this regard.

However, the concepts herein and embodiments can be extended to other parts of cylindrical symetry besides camshafts. The easiest extension is indeed the crankshaft which, while there is no need to sense over the ranges required for the cam lobes, there are the journals and the pins and the fillet contours which can be sensed using sensors of exactly the same type. Indeed one of the interesting features is to gage the journals of the crankshaft and simply move the nest of sensors slightly so as to get into the fillet area of the crank and contour it.

It should be noted that when gaging the journals, the base circles or the crankshaft journals, for example, that a ordinary white light such as a tail lamp can provide ample illumination replacing the diode laser in FIG. 2. And too there is no particular requirement to pulse in these zones since there is not a rapid change of shape or a depth of field. In general, simpler lens systems can also be used since there is no need to deal with the depth of field that occurs on the cam.

Next consider the case of inspection of crankshafts according to the invention. First, it is clear that the sensor arrangements used for camshaft journals described above can also be used on crankshaft main bearing journals, hubs, gear fit diameters, posts and other important crankshaft dimensions whose diameters are centered on the axis of rotation. The same sensor, transfer and lift arrangement shown in FIG. 5 is indeed ideal, although usually it is desirable to employ separate sensors as described above. Those should have sufficient standoff to clear the crank pin orbits on rotation.

For the crank pin diameters a separate pair of sensors for each diameter can be used located so as to view the pin at some point in its orbit, generally at top dead center. Since measurement can be taken on the fly according to the invention there is very desirably no need to stop the crank rotation to gage the pins, or to even locate the crank circumferentially since the sensor unit can be programmed to read only when the pin diameter image is in its field of view.

Shown in FIG. 7a is an alternative embodiment of the sensor head which obviates the requirement for placing the circuit cards near the sensor plus provides a smaller sensor housing dimension. In this case a pair of light sources 600 and 601 illuminate for example the opposite edges 605 and 606 of crankshaft pin journal 608 as it revolves about axis 609. Sensing occurs when a signal from detector 610 indicates that the pin journal is in the correct position, typically top dead center as shown.

A pair of sensor units 611 and 612, comprised of a housing 613 containing lens 614 and fiber optic light conveying means 615 which carries the image of the part edge back to a remotely located diode array 620 in readout box 621. Optionally the light sources can also be comprised of remote light source such as LED 622 conveying light through fiber 623 which is then colimated by lens 624. Plates 616 and 617 hold the sources and sensors in alignment. Optional windows 618 and 619 are also provided.

In this example two types of fiber conveying means can be utilized: Coherent fiber bundles and single fiber wave guides such as Selfoc long laser guide. The first case has been illustrated above wherein lens system 614 focuses a magnified image of the part edge onto the fiber bundle end and output lens 625 focuses the end of the bundle onto the diode array.

A second version illustrated in FIG. 7b utilizes a single waveguide fiber 630 at the approximate focus of object lens 631 (typically 25 mm focal length), both in housing 632. At the output, diverging field 633 can be directly read by diode array 634 or further imaged and magnified by lens 635.

A feature of the wave guide fiber is simplicity, potential low cost, smaller size and the much higher image quality since it is a single medium behaving like a lens. This also means that it is not necessary to magnify the image presented to the fiber to avoid interstitial problems and accordingly simple fiber end matching sensor and larger standoffs to the part can be used. This is particularly valuable in this crankshaft example where one wishes to clear the pin orbit while maintaining high resolution.

Another feature of this embodiment is that a single diode array and circuitry can service multiple sensor heads. For example, in FIG. 7a, a single lens 625 is shown imaging outputs from fibers from both pin journal edge sensors. Signal processing is adjusted accordingly to find each image.

It is noted that a series of remote LED light sources can be pulsed in succession one for each sensor. This automatically causes only one image on the array at a time. Alternatively a single white light bulb for example can illuminate multiple fibers at once, implying reduced price.

The fiber approach has many advantages including ease of design and manufacture. It is, however, difficult to use in cases where utmost range or resolution are required.

The gage microcomputer and other array readout circuits are desireably co-located with the array and fiber termination. Light source(s) 622 can also be located there as well to provide a total self contained package.

Note that since a crankshaft gage according to the invention typically employs 30–50 such sensor heads (for main and pin journals, hubs mains etc.) it is desirable to protect the whole ensemble of sensors (extending in and out of the plane of the figure) with plate glass windows 645 and 646. These seal up the total light source herein 648 and sensor housing 647 and also are easy to clean—an important feature in a plant.

Figure 8:
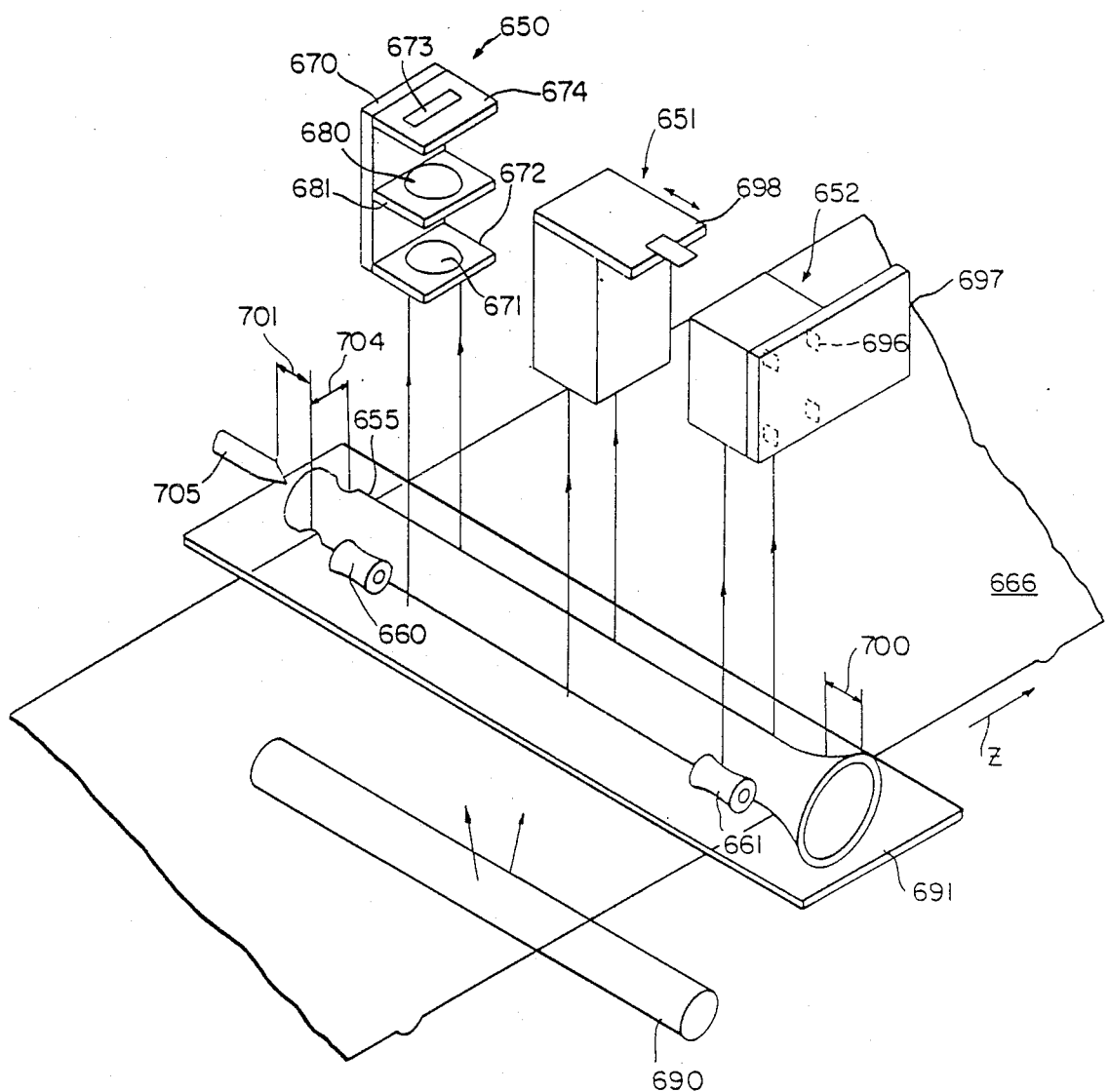
FIG. 8 is a diagrammatic perspective view of a further embodiment of the invention involving the inspection of engine valves.

It is noted that the concepts described herein can also be used to check rough castings of cam cranks and other parts before machining thereby preventing machine damage and helping to insure good finished parts FIG. 8 illustrates another construction of the sensor housing suitable to close packing and large range. In the example shown, three sensors according to the invention 650, 651 and 652 are arranged so as to sense the diameter and relative contour (ie. bow) runout of an engine valve stem 655 when the valve is rotated in vee rollers 660 and 661. Transfer means 666 comprising chain or walking beam moves valves in and out of the roller fixture as in FIG. 5 above.

In a gage of this type it is desired to have large sensor range to accommodate multiple valve diameters, while also having high resolution (typically 50 millionths of an inch) and small package size particularly in the width or direction along the valve axis. This allows the sensors to be easily repositioned axially for different valve types. Such requirements are similar to those of the camshafts and crankshafts noted above but in this case it is also desirable to image both edges of the valve diameter on the same diode array using a single lens. This makes for the most compact and lowest cost package, but is simply not feasible with larger parts due to their larger diameters.

The sensor housing for example that of sensor 650, is desirably constructed using steel base plate 670, typically 0.2" wide by 6" long and ¼" thick to which the objective lens 671 in mount 672, and diode array 673 in mount 674 are attached. In this case, a two lens system is utilized also incorporating a negative system lens 680 in mount 681 which allows maximum standoff to the part while still remaining optical magnification in the required 2:1 to 5:1 range. Additional 2× to 10× magnification is obtained electronically using circuitry as described. As above, compensating detector is often desirable.

The cover, not shown for clarity, seals the sensor from the outside and a window is also useful for this purpose (unless all sensors in the group are situated behind a single easy to clean plate glass such as 691.

Clearly the light sources can also be constructed in similar housings housing base plates, mounts and formed covers. However, in this example a long linear light source is shown, 690, extending the length of the observed area of the part. This allows easy mounting and replacement and is typically also covered by plate window 691 for protection. If required a stop can be used in the lens system to accept only quasi parallel light from this source, otherwise diffuse. However, depth of field in such a fixtured valve rotation example is seldom a problem as the part is of high tolerance.

The sensor housing incorporates dowel pins 696 (shown on base of sensor 652, for clarity) to allow easy repositioning into mounts such as 697 for part changeover. Alternatively micrometer slide mounts can be provided, such as 698 on sensor 651 to move the head to a new location. Such movement can even be motorized on command using a stepping motor, thus providing full electronically commanded changeover for different valves. It is noted that the use of the long lamp 690 is advantageous in that no repositioning of the light source is required for each valve size.

For further inspecting valves several other similar sensor are also desirable. For example, axial scanning ones 700 (shown along line of viewing) to sense the gage line on the valve seat and 701 to measure the foot and location. Another two may be employed to sense the head diameter and runout and 704 to sense keeper groove diameter and runout. (Runout is determined by looking at the location deviation on one edge alone during rotation.) Note provision of stop 705 to rest foot against during rotation by rubber roller drive means not shown for clarity.

Figure 9:
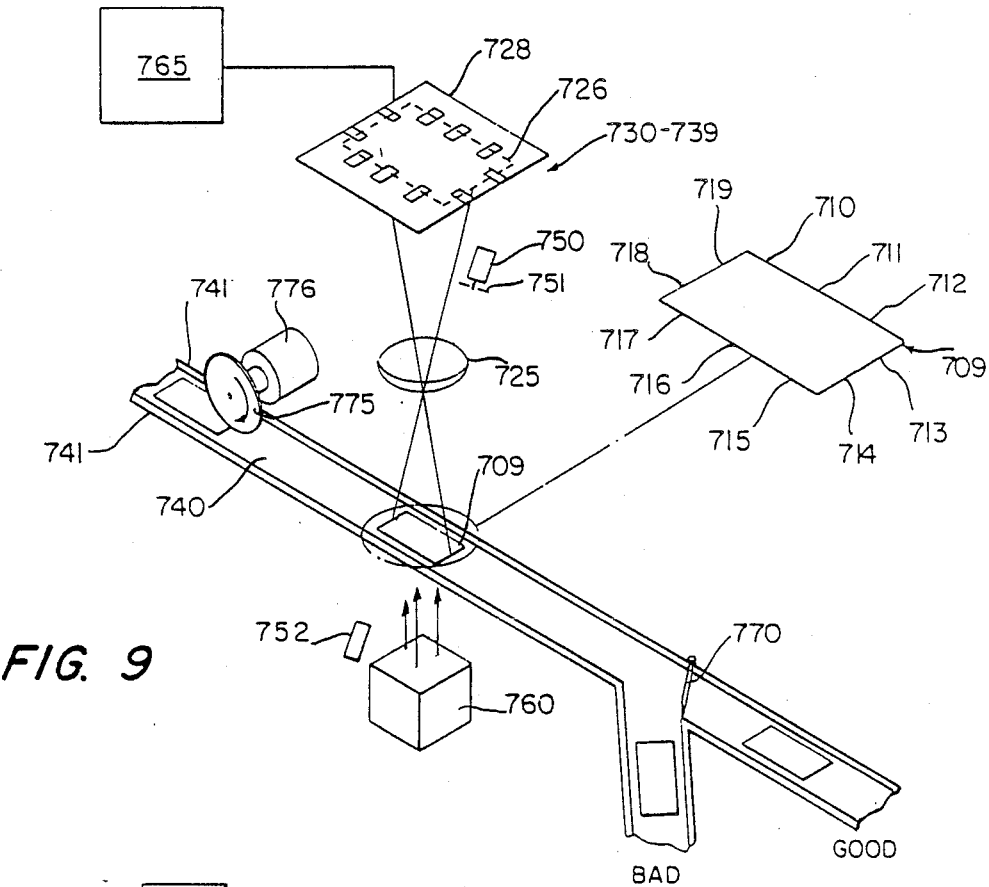
FIG. 9 is a diagrammatic perspective view of a further embodiment of the invention involving the inspection of a transmission pump vane.

FIG. 9 illustrates another embodiment of the invention utilized to sense the shape of parts conveyed past a "nest" of sensor heads according to the invention.

In this context it is of interest to observe that the valves shown in FIG. 8 could be moving in the z direction, with their diameter and relative bow dimension in one plane measured on-the-fly (using high speed arrays or pulsed sources as above) as they were transfered through the sensor field. Such measurement would allow a much faster rate than the 4000/hr maximum capable when a rotation in place is necessary for 360° inspection.

Such an example, shown in FIG. 9, is illustrated relative to a quasi-flat part, namely a transmission pump vane 709, whose outer edge points 710–719 are measured using a nest of photo diode arrays 730–739 mounted to steel plate 728. In this case, because of the part small size, (eg. 1" square) a single lens 725 is used, to form the part edge image 726 on the arrays. Diode array circuit cards are in a separate rack not shown above plate 728.

In operation, the part is fed from a feeder not shown down Teflon Track 740 past the sensor group or "nest". When the part trailing edge is sensed to be in position using sensor diode 750 with slit 751 and LED light source 752, the light 760 is pulsed to illuminate the part edge and freeze it on the diode arrays for measurement. Appropriate holes are cut in the track bottom to allow the light to pass through at the measuring locations.

Where resolution requirements are not stringent, a pulsed Xenon lamp can be used to illuminate the part, using a diffuser screen or collimating lens between it and the part.

However, in the case shown, the resolution desired is 1 micron, and this requires very short pulse widths and a high degree collimation to freeze the part and provide a decent light field. Accordingly it was desired in this case to use a nest of pulsed diode lasers (not shown for clarity) having 200 nsec. pulse widths to illuminate the edge points 710–719. Each diode laser utilized an individual lens to collimate its output.

To further provide accurate measurement of the part length and width at various sections, plus provide a calculated value for straightness and squareness of the edges, a micro computer 765 is utilized to compute and compare defected edge points from arrays 730–739 and further utilize this data to correct for skewness of the part in the track. This is typically a small cosine error since the part is retained within 0.010" or better by the track side rails 741.

The microcomputer can obtain the requisite data for part acceptance or reject before the part reaches the reject gage 770 10" away. Incredibly, this system can check 30,000 parts per hour, feeder permitting, and is 10 times faster than any gage used previously. A direct increase in productivity of 1000%. Furthermore, because of the non-contact operation, it is virtually jam proof.

Note that a metering wheel 775 driven by motor 776 is often desirable on the track to regulate the speed of the sliding parts within a certain band.

The diode arrays used in this case were Reticon 256C's having 0.001" center to center spacing. A 10x lens magnification was used via a 50 mm Canon F 1.4 lens and a 4× electronic multiplication as described above to obtain 25 microinch resolution of part edge dimension.

Figure 10A:
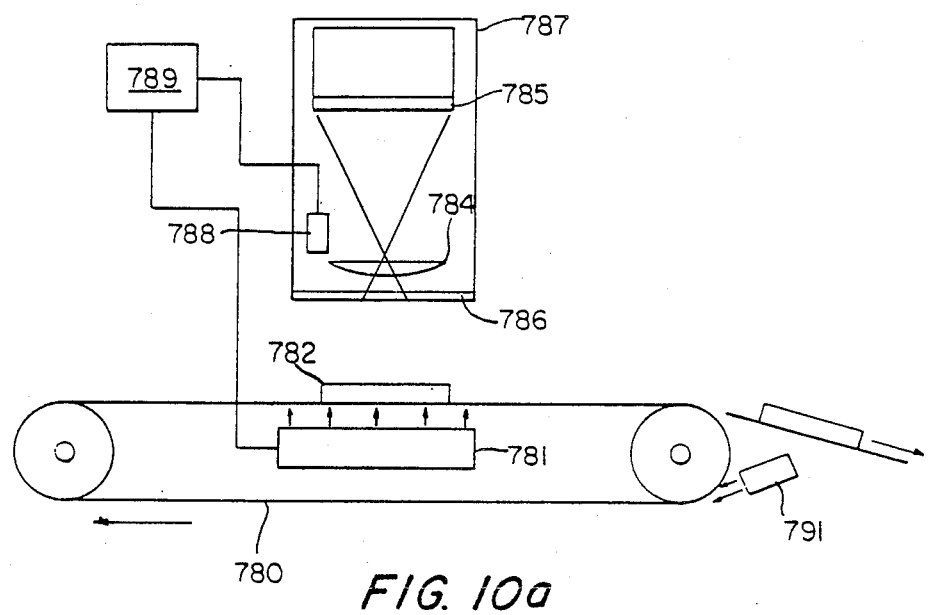
FIG. 10A is a diagrammatic side elevation view of a further embodiment of the invention involving the use of a transparent conveyor belt.
Figure 10B:
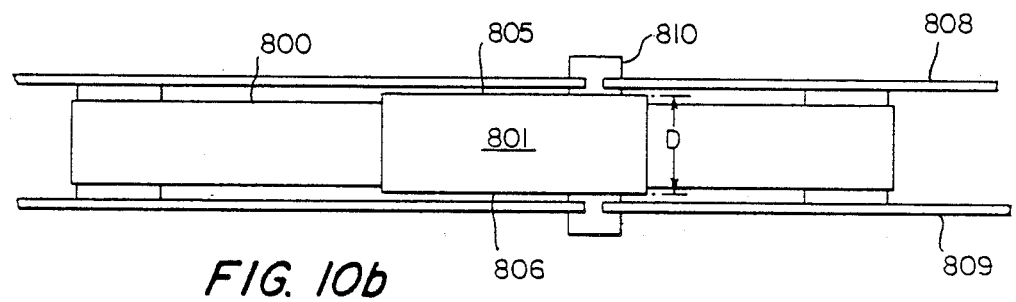
FIG. 10B is a diagrammatic plan view of a further embodiment of the invention involving the use of a conveyor belt having less width than the width of the object undergoing inspection.
Figure 10C:
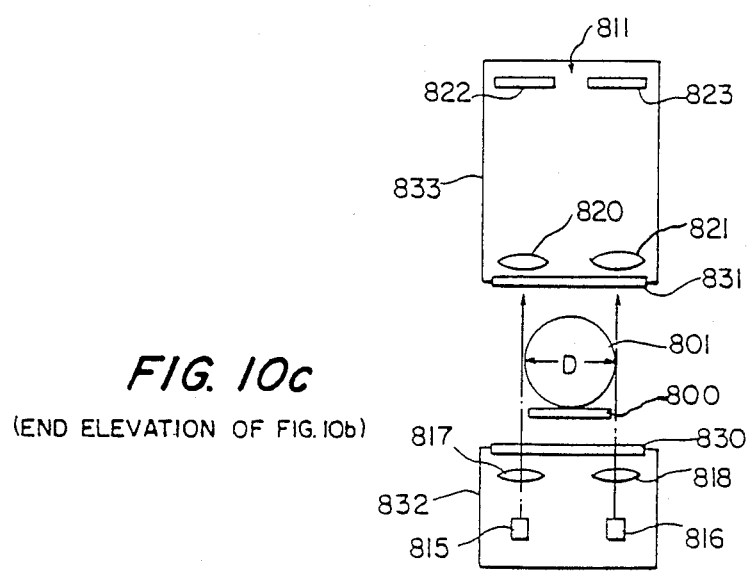
FIG. 10C is a diagrammatic end elevation view of FIG. 10B.

In the above example, it is often desirable to replace track 740 with constant speed moving belt such as those of FIG. 10. For example, shown in FIG. 10A a transparent plastic belt 780 is used in which Xenon strobe lamp 781 illuminates chain link side bar 782 in profile on command of part present sensor such as 750 previously and not shown for clarity, and freezes its image, formed by lens 784, on matrix type diode array 785 in this case a GE TN 2500 having 250 adjacent lines of 250 elements each on 0.001" centers approximately.

As in all other optical gages here disclosed, a window 786 is desirably used to protect the sensor, itself in air tight enclosure 787.

As in other embodiments it is desirable also to compensate for dirty windows and light source degradation. In this particular case it is also necessary to compensate for dirt etc. on the transparent belt 780. To accomplish compensation, a detector 788 is utilized coupled to a Thyrister flash circuit 789 to turn the flash off when the detector circuit has seen a standard amount of light. This is a simple yet elegant solution.

Also desirable is a blow-off or wipe-off 791 to clean debris off the belt, on the return pass.

Another desirable belt arrangement is shown in FIG. 10B. In this case only part outer diameter dimensions are required and an opaque belt 800 can be used. The belt conveys cylindrical wrist pin 801 past the sensor unit as before, but it is noted that in this case the belt is slightly less in width than the part diameter D. This allows the edges 805 and 806 to be seen when the part is guided by guides 808 and 809. A continuous light source 810 and dual linear array sensor, 811 (inset) can be used to profile the wrist pin and obtain its largest diameter, taper, etc.

As shown the continuous light source of this example is provided by continuous diode lasers 815 and 816, with collimating lenses 817 and 818. Images are formed by lenses 820 and 821 on linear diode arrays 822 and 823. Typically 10x magnification is utilized where high tolerance parts are inspected such as wrist pins. Windows 830 and 831 are provided on the light source and sensor housings, 832 and 833.

The transparent belt above offers considerably more flexibility in that a large variation in part size can be accommodated just by changing the side guides and the sensor readout program, limits or magnification as required.

Before continuing, it is of interest to consider the use of the marix array of FIG. 10. Clearly one flash is all that is required to freeze the total part image on the array from which it is readout, digitized and compared before the next part arrives.

Of considerable importance in actually using a matrix array system in this fashion is that the resolution requirements are often quite high relative to the number of detectors available in any one line. Stated another way, a 1"×¼" chain link side bar can on the face of it only be resolved to at best 0.004" in any dimension if a 250×250 element array is asked to look at the whole part image. This too assumes perfect triggering by the part present sensor.

Accordingly, it is desirable to orient the scan lines of the matrix array perpendicular to the direction of motion such that the main dimensions of interest, e.g. part diameter, part width, thread form etc. are scanned sequentially. Then a count multiying circuit such as described in FIG. 4 above can be utilized to increase the sensitivity of each scan. This then can give the array system a resolution of up to 10× greater in the direction of the scan (in this example that transvers to part motion).

Another item of interest is that reflective illumination can also be utilized, rather than the profile types shown. For example, in FIG. 10A consider that the flash guns were located in a position above the belt which now could be opaque. In this case, the compensation detector and circuit also helps compensate for part reflectivity variation.

This same reflective illumination can be used with other embodiments. However, image quality is always better if the part edges can be seen in profile, rather than in reflection.

Note that belt can be dark (e.g. black rubber) in which case the part itself provides the predominant light reflected. Alternatively, the belt can be reflective (either diffusely or specular—depends on light source to—sensor angle) such that the belt reflection is stronger than that from the part, in which case the effect is like profile illumination from below.

It should also be noted that the count multiplication technique described can also be used to improve the performance of circular diode arrays for example the Reticon 720C. This array can be placed in the apparatus of FIG. 10A for example to determine the angular center to center spacing of holes in a bolt circle on a part conveyed on a transparent belt as shown, or in reflection.

Figure 11:
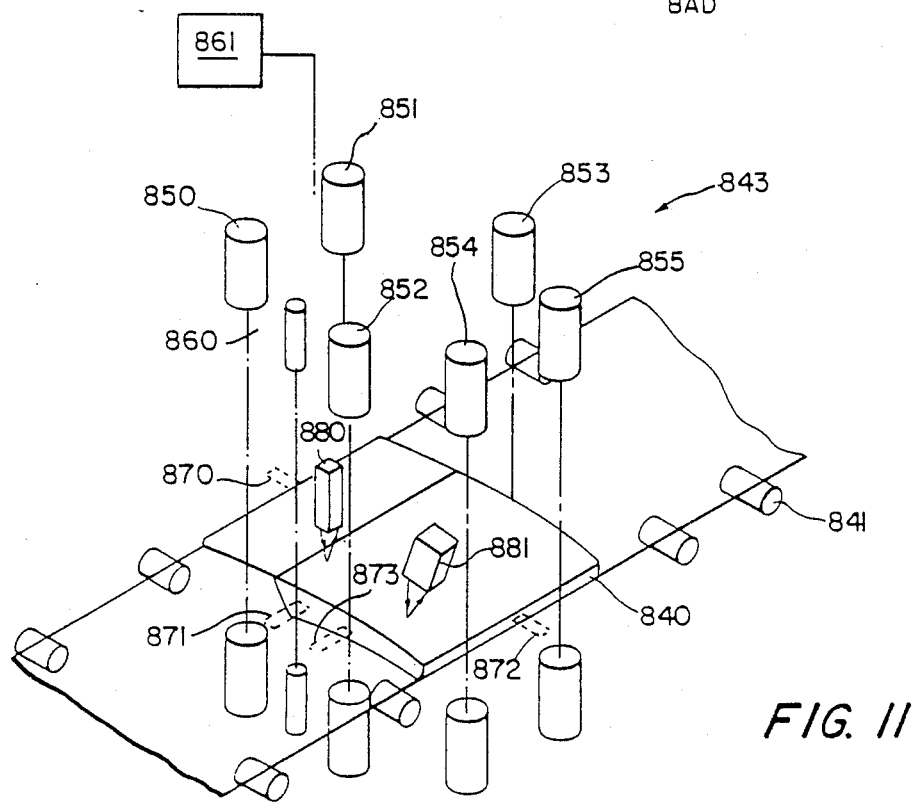
FIG. 11 is a diagrammatic perspective view of a further embodiment of the invention involving the inspection of an automobile door panel.

A further embodiment is shown in FIG. 11, where a group of sensors according to the invention is utilized to determine the outline of an automotive sheet metal panel assembly in this case a door. Determination of outline dimensions is essential if the door is to fit correctly into the finished body. Data taken from such an inspection is typically fed back to welding operations to correct fixture locations etc.

This example illustrates the use of pre alligned sensor packages versus separated source and sensor units, measurement fixtured parts or on-the-fly and use of additional triangulation sensors to establish dynamic reference points and perform additional measurement of sheet face contour points rather than just door outline.

FIG. 11 door 840 is moved by rollers 841 into the gage 843 comprised by diode array sensors 850–855 and associated light sources used to determine the outline of the door (typically as many as 20 such sensors can be used). In a first mode, similar to that of FIG. 9 above, mesurement is made on-the-fly by using optical part present sensor 860 to determine the part is in position and trigger the sensors 850–855 to readout their outputs into readout control and microcomputer control 861.

A complication in this case arises because part shape is somewhat irregular and location cannot be well constrained as with the guides used in the track or belt used for the pump vanes etc. described above. In addition, three dimensional coordinates, rather two dimensional outlines are also required in certain instances, yielding another variable to be controlled.

There are two solutions to the location problem. First, physical locators can be used such as steps 870, 871, 872 and 873 (dotted lines). The stops, actuated by cylinders, solenoids etc. This solution, however, requires the part to be stopped and considerable further mechanical complexity.

The second idea is to utilize other sensors according to this invention plus triangulating types such as 880 and 881 also described in copending application Ser. No. 34,278, now U.S. Pat. No. 4,373,804 the disclosure of which is herein incorporated by reference, to dynamically establish the coordinate reference simultaneous with the measurement. In this arrangement it is noted that the light sources and sensors used to locate and determine door coordinates must be positioned so as to clear the path of the door and must be able to effectively operate instantaneously on command of the part present signal.

Note that the count enhancement technique shown in FIG. 4 is further benefited by having a circuit operating at a low threshold voltage (e.g. below level 1) which looks for the edge. When it finds it, it then looks at the maximum voltage of any detectors nearby and sets up the threshold levels 1-4 from that. In addition only count deviation from the 1st detected count is derived, so as to determine edge location. In this way, a badly variant light field still does not influence the readings (an important point in practice).

Due to the limitation of the finite size of elements in diode arrays, the position of an edge of image cannot be detected to a greater accuracy than one element, when conventional means of detection are utilized. However, when using interpolation between elements, the resulting improvement in accuracy is only limited by the quality of the diode array.

Figure 13:
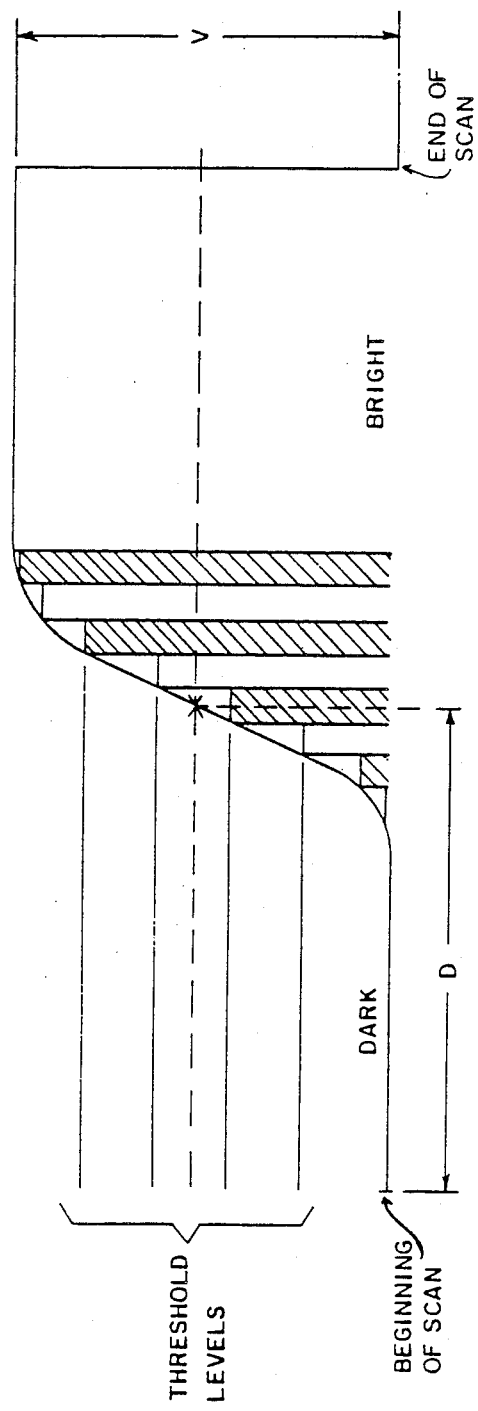
FIG. 13 is a graphical representation similar to that of FIG. 4.

FIG. 13 shows the video output with an edge focussed on the array. The transition from dark to light is gradual, even with a well focussed image. This fact allows the interpolation process to take place by taking into account the illumination levels on the array elements in the transition zone. By setting, for example, four threshold levels and detecting the video against these levels, the mid-point of the transition can be found to an accuracy equal to one fourth the element to element distance.

Figure 12:
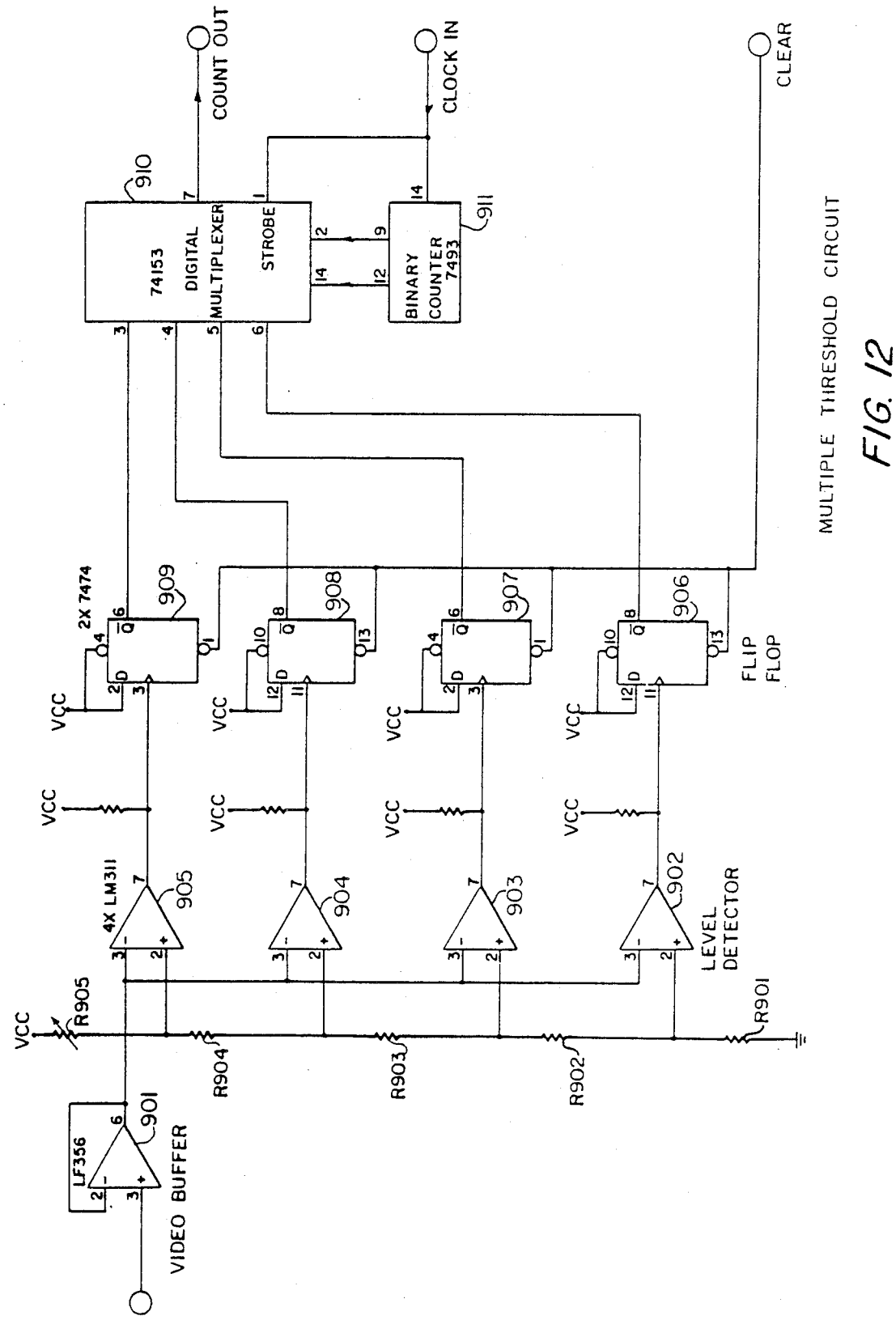
FIG. 12 is an electrical schematic diagram of a circuit for performing an analysis of the electrical signals of the type graphically illustrated in FIG. 4.

A circuit for automatically, continuously interpolating the video output is shown in FIG. 12. The video signal is fed to four similar level detectors (902–905) by a video buffer (901). Level detectors (902–905) can be a conventional differential operational amplifier such as an LM 301 and video buffer can be a conventional operational amplifier such as an LF 356. The threshold levels are set by a voltage dividing resistor chain comprising resistors R901, R902, R903, R904 and can be adjusted by a variable resistor R905. The ratios of the voltages are set by selecting the appropriate resistor values. The output of each level detector is fed to the clock inputs of conventional D-type flip-flops 906, 907, 908, 909 (such as integrated circuit 7474). The respective Q outputs of flip-flops 906–909 are interrogated cyclically in sequence by a digital multiplexer 910 (such as integrated circuit 74153) that is sequentially clocked by a binary counter 911. Binary counter 911 can be a conventional integrated circuit 7493 that is clocked at a frequency four times higher than the array frequency with the two frequencies being synchronized.

The count out output from multiplexer 910 is in a form of a pulse train which we call count output. This output would normally be fed to the count input of a totalizing counter (not shown).

At the beginning of each scan flip-flops 906–909 are reset and during the scan time, when the video signal reaches a threshold level, the appropriate one or ones of the flip-flops is or are set. The continuously scanning multiplexer 910 produces a count pulse for each flip-flop that has been set high on each of the scan sequences.

I claim:

1. Apparatus for inspecting a workpiece comprising:
    electro-optical sensor means for sensing the positions of a plurality of edge portions of a workpiece in an inspection location, said electro-optical sensor means comprising:
        light source means for illuminating a plurality of edge portions of a workpiece in said inspection location; lens means for forming an image of each of said illuminated edge portions; and a plurality of photosensitive arrays, each array comprising a plurality of light sensitive elements capable of producing an electrical signal in response to light incident thereon, each array being positioned to receive an image of a respective illuminated edge portion of a workpiece;
    means for analyzing the signals from said light sensitive elements to determine a dimension of said workpiece; and
    further sensor means for determining the position of a workpiece in said inspection location, said further sensor means comprising
        light source means for illuminating a plurality of known portions of a workpiece in said inspection location, lens means for forming an image of each of said illuminated known portions and a plurality of photosensitive arrays, each array comprising a plurality of light sensitive elements capable of producing a signal in response to light incident thereon, each of said arrays being positioned to receive an image of a respective illuminated known portion of said workpiece in said inspection location, and means for analyzing the signals from said light sensitive elements of said further sensor means to determine the position of a workpiece in said inspection location.

2. Apparatus according to claim 1 further comprising means for moving a workpiece through said inspection location.

3. Apparatus according to claim 2 wherein said light source means of said sensor means and said light source means of said further sensor means each comprise means for pulsing the light to freeze the images of respective illuminated portions of said workpiece in the respective photosensitive arrays of said sensor means and said further sensor means.

4. A method for inspecting a workpiece comprising:
    illuminating a plurality of edge portions of a workpiece in an inspection location;
    forming an image, by lens means, of each of said illuminated edge portions;
    imaging each of said illuminated edge portions onto an individual discrete photosensitive array of a plurality of discrete photosensitive arrays, each said discrete array comprising a plurality of light sensitive elements capable of producing an electrical signal in response to light incident thereon;
    analyzing the signals from said light sensitive elements to determine a dimension of said workpiece; and
    determining the position of a workpiece in said inspection location, said position determining comprising
    illuminating a plurality of known portions of a workpiece in said inspection location, imaging each of said illuminated known portions on a photosensitive array comprising a plurality of light sensitive elements capable of producing a further signal in response to light incident thereon, and analyzing the further signals from the light sensitive elements to determine the position of a workpiece in said inspection location.

5. A method according to claim 4 further comprising moving said workpiece through said inspection location, and wherein said illumination of said edge portions and said known portions of said workpiece each comprise pulsing the light to freeze the images of the said edge portions and known portions on the respective photosensitive arrays as the workpiece is moved through said inspection location.

* * * * *